United States Patent [19]
McDougald

[11] Patent Number: 6,093,329
[45] Date of Patent: *Jul. 25, 2000

[54] AIR SCOUR/BACKWASH APPARATUS FOR CELLESS TRAVELING BRIDGE FILTER

[75] Inventor: Mack McDougald, Ochlocknee, Ga.

[73] Assignee: United States Filter Corporation, Palm Desert, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,470

[22] Filed: Oct. 4, 1996

[51] Int. Cl.[7] .................................................. B01D 24/46
[52] U.S. Cl. .......................... 210/794; 210/274; 210/275
[58] Field of Search .................................. 210/264, 274, 210/275, 793, 794, 795

[56] References Cited

U.S. PATENT DOCUMENTS

| | | | |
|---|---|---|---|
| 2,235,227 | 3/1941 | Lose, Jr. | 210/128 |
| 2,302,449 | 11/1942 | Laughlin | 210/130 |
| 3,239,061 | 3/1966 | Horning et al. | 210/80 |
| 3,631,983 | 1/1972 | Mail | 210/274 |
| 3,680,701 | 8/1972 | Holca | 210/274 |
| 3,698,554 | 10/1972 | Mail | 210/794 |
| 3,741,390 | 6/1973 | Wallace et al. | 210/274 |
| 3,932,278 | 1/1976 | Meidl et al. | 210/80 |
| 3,984,326 | 10/1976 | Bendel | 210/264 |
| 4,076,625 | 2/1978 | Scholten et al. | 210/274 |
| 4,133,766 | 1/1979 | Adie | 210/275 |
| 4,486,307 | 12/1984 | Weiler | 210/275 |
| 4,540,487 | 9/1985 | Johnson et al. | 210/264 |
| 4,617,131 | 10/1986 | Walker | 210/794 |
| 4,624,783 | 11/1986 | Black et al. | 210/271 |
| 4,764,288 | 8/1988 | Walker et al. | 210/793 |
| 4,859,330 | 8/1989 | Pauwels | 210/264 |
| 4,957,631 | 9/1990 | Pauwels | 210/264 |
| 4,988,439 | 1/1991 | Medders, II | 210/264 |
| 5,032,294 | 7/1991 | Schulz | 210/795 |
| 5,078,873 | 1/1992 | Black et al. | 210/264 |
| 5,080,808 | 1/1992 | Kim et al. | 210/792 |
| 5,089,117 | 2/1992 | Nichols | 210/264 |
| 5,156,738 | 10/1992 | Maxson | 210/274 |
| 5,198,124 | 3/1993 | Kim et al. | 210/792 |
| 5,296,138 | 3/1994 | Walter | 210/274 |
| 5,401,405 | 3/1995 | McDougald | 210/273 |
| 5,431,809 | 7/1995 | McDougald | 210/264 |
| 5,489,388 | 2/1996 | Brown et al. | 210/794 |
| 5,552,045 | 9/1996 | Wagner | 210/264 |

FOREIGN PATENT DOCUMENTS

| | | |
|---|---|---|
| 0433028 | 6/1991 | European Pat. Off. . |
| 5310 | 8/1911 | United Kingdom . |

Primary Examiner—Ivars Cintins
Attorney, Agent, or Firm—Nixon & Vanderhye P.C.

[57] ABSTRACT

A method of backwashing a filter includes a) supplying a backwash liquid via a conduit toward one end of a filter bed; b) aspirating air into the backwash liquid upstream of the bed; c) introducing a mixture of air and backwash liquid into the filter bed at the one end thereof; and d) expelling backwash water and air from an opposite end of the filter bed. A related filter system includes a filter basin having a bed of filter media material therein; a filtrate channel proximate the basin; at least one tubular underdrain header in the bed and in fluid communication with the filtrate channel; and a backwash pump having a backwash water supply conduit selectively engageable with the underdrain header for supplying backwash liquid to the bed. The backwash water supply conduit includes a nozzle for aspirating air into the supply conduit at a location between the backwash pump and the bed.

21 Claims, 4 Drawing Sheets

AIR SCOUR/BACKWASH APPARATUS FOR CELLESS TRAVELING BRIDGE FILTER

This invention relates generally to backwashing filters and, specifically, to a combined air/water (or other liquid) backwash arrangement in a traveling bridge filtration system.

BACKGROUND

It is well known in the art to utilize gravity downflow filtration tanks divided into a plurality of filter cells, one adjacent the other, and all containing a multi-layer or single layer arrangement of granular filter media such as sand, gravel and the like. In typical downflow filtration systems of this type, water or other liquid containing suspended solid particles is introduced into the filter basin from above, and clarified water is drawn off from a chamber either beneath or adjacent the individual filter cells. During downward flow through the individual cells, particulate matter is entrapped within the layer or layers of granular filter media, but eventually, the particulate matter clogs the filter media, thereby reducing the filtering capability of the system. Thus, there is a need for a periodic cleaning of the filter cells. This is usually accomplished by backwashing the filter via introduction of backwash water or other liquid into the filter in a direction opposite the normal filtration direction. It is also known to maintain such units in continuous operation during backwash by the use of traveling bridge devices which move from one filter cell to the next, cleaning individual cells while permitting the filtration process to continue in the remaining cells.

Examples of traveling bridge apparatus may be found in U.S. Pat. Nos. 5,041,405; 5,089,117; 4,988,439; 4,957,631; 4,859,330; 4,764,288; 4,617,131; 4,540,487; 4,486,307; 4,133,766; 3,984,326; 2,235,227; and 2,302,449. Typically, traveling bridge systems include an overhead carriage, movable along tracks, guideways or the like, which supports a backwash hood for movement along and over the open upper ends of the filter cells, usually in a step-wise manner. As already mentioned, for a downflow type filter, water or other treatment liquid is caused to enter into the cell being backwashed (by a backwash pump) from below in a counterflow arrangement to the normal filtering direction. The backwash hood typically also includes a suction head (i.e., an additional pump) for drawing out fluid and debris forced to the surface of the filter cell as a result of the backwash. As backwashing of individual cells is completed, the traveling bridge moves the backwash hood over the next adjacent cell.

It is also known to utilize combined air/water backwash techniques in traveling bridge systems. Combined air/water backwash systems are generally used in conjunction with single media, unstratified filter beds, and are usually employed to increase the effectiveness of water only backwash. These systems utilize a backwash pump in combination with an auxiliary air supply such as a blower or compressor. Examples of a combined air/water backwash in a traveling bridge filter may be found in U.S. Pat. Nos. 5,078,873; 5,032,294; 4,624,783 as well as in commonly owned U.S. Pat. Nos. 4,859,330 and 5,401,405.

In U.S. Pat. No. 5,401,405, an improved air/water backwash system is disclosed in which air is drawn into air supply risers in each cell by negative pressure in the cell. This system also incorporates a self-aspirating venturi which expels entrained air or gas through the backwash water discharge pipe.

In commonly owned, U.S. Pat. No. 5,792,359, a celless traveling bridge filter is disclosed, utilizing a plurality of transversely arranged underdrain headers for carrying filtered water to the filtrate channel, and also for introducing backwash water into the filter media, in combination with a unique backwash sealing shoe which prevents escape of backwash water from the bed back to the adjacent filtrate channel by blocking the outlet ports of adjacent headers.

SUMMARY OF THE INVENTION

This invention provides further improvements in air scour/backwash apparatus for use in both cell-type and celless traveling bridge filtration system. The construction of the filtration tank including the underdrain headers, the celless configuration of the filter media bed, and the backwash sealing shoe assembly may be substantially as described in commonly owned co-pending application Ser. No. 08/676,490, the entirety of which is incorporated herein by reference. The backwash hood assembly, carried by the traveling bridge, may be substantially as described in U.S. Pat. No. 5,401,405, the entirety of which is also incorporated herein by reference. The latter also discloses a typical tank configuration with a plurality of cells defined by spaced cell dividers or partitions. Differences in both the backwash shoe assembly and the backwash hood assembly in accordance with this invention are noted further below.

A backwash pump is located within the filtrate channel which lies laterally adjacent the filter basin. This backwash pump is part of the backwash sealing shoe assembly is suspended from the bridge. The sealing shoe successively engages laterally spaced outlet ports, connected to respective lateral headers on the filter basin, as the bridge moves from one end of the basin to the other. A bellows-type actuator, as described in commonly owned co-pending application Ser. Nos. 08/179,693 and 08/395,082 (also incorporated herein by reference) may be utilized to actuate the backwash shoe into successive sealing engagement with the filter basin outlet ports.

In accordance with this invention, an aspirating nozzle assembly is incorporated within the backwash water supply conduit at a location between the backwash pump and the backwash sealing shoe. This nozzle assembly includes a reduced diameter nozzle within the supply conduit at a location adjacent a lateral opening connected to an air supply line which extends upwardly from the filtrate channel and which is open to atmosphere. As backwash liquid flows through the reduced diameter nozzle, air from the air supply line is aspirated into the backwash supply conduit so that a mixture of air and water is supplied to the filter basin underdrain headers for the purpose of combined air scour/backwash. An airflow meter may be utilized in conjunction with an automatic valve for control of the amount of air aspirated into the backwash conduit.

With the introduction of the air/water mixture into the filter media bed, the filter media is thoroughly agitated and cleaned, with portions of the bed being drawn up into the backwash hood for additional agitation and washing. The hood assembly includes air/media diversion baffles in combination with air exclusion baffles so that the backwash air can be separately vented from the hood, while the backwash water and removed debris is drawn upwardly out of the hood by a second pump mounted either on the hood or on the traveling bridge. The backwash waste water is then discharged to a fixed trough rung alongside the filtration tank.

The above described arrangement significantly reduces system costs because it eliminates the need for a separate blower for supplying air to the backwash process, as well as the need for separate air supply pipes or risers within the filter media bed.

Accordingly, in its broadest aspects, the present invention provides a method of backwashing a filter comprising:
 a) supplying a backwash liquid via a conduit toward one end of a filter bed;
 b) aspirating air into the backwash liquid upstream of the bed;
 c) introducing a mixture of air and backwash liquid into the filter bed at the one end; and
 d) expelling backwash water and air from an opposite end of the filter bed.

In another aspect, the invention relates to a filter system comprising a filter basin having a bed of filter media material therein; a filtrate channel proximate the basin; at least one tubular underdrain header in the bed and in fluid communication with the filtrate channel; a backwash pump having a backwash water supply conduit selectively engageable with the at least one underdrain header for supplying backwash liquid to the bed; and wherein the backwash water supply conduit includes means for aspirating air into the conduit at a location between the backwash pump and the bed.

In still another aspect, the invention relates to a traveling bridge filtration apparatus including a tank having a pair of side walls, a pair of end walls and a floor defining a filtration basin including a downflow, filtration bed; a bridge adapted to travel across the top of the tank, the bridge supporting a backwash pump, a backwash hood and enclosed waste water removal manifold; a partition wall between said side walls forming filtrate channel adjacent the filtration basin for receiving filtered effluent from the tank and for supplying backwash liquid to the filtration bed via the backwash pump; an underdrain comprising a plurality of tubular headers extending in horizontally spaced relationship through the bed and in communication with the filtrate channel, each header being provided with a plurality of apertures along its length; and wherein the backwash pump is selectively engageable with each of the plurality of headers by means of a backwash supply conduit connected to a sealing shoe constructed to provide access to at least one of said headers, and further wherein the supply conduit incorporates a nozzle and an air supply port for aspirating air into the backwash liquid downstream of the backwash pump and upstream of the filtration bed.

Other objects and advantages of the subject invention will become apparent from the detailed description which follows.

DETAILED DESCRIPTION OF THE DRAWINGS

Figure 1:
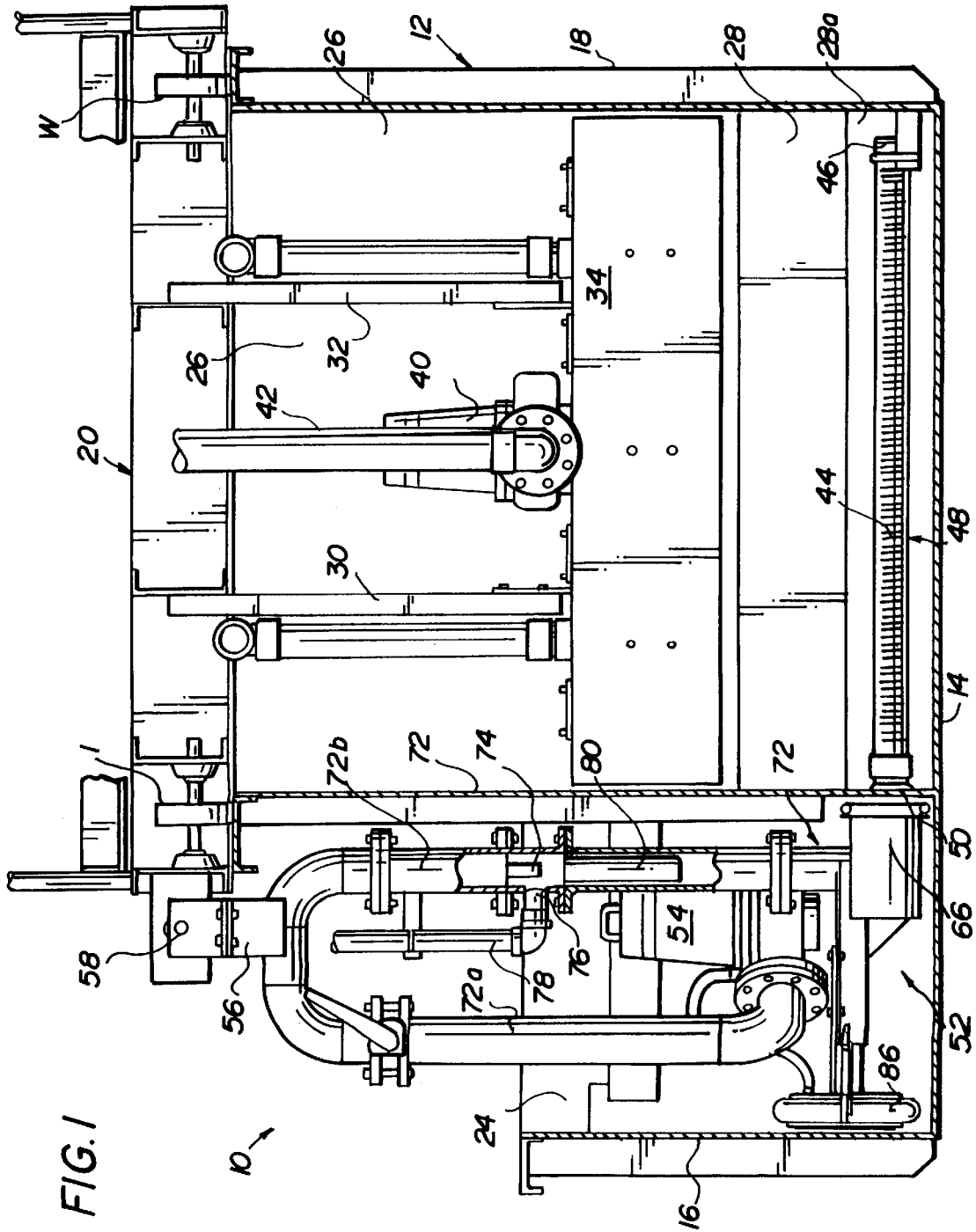
FIG. 1 is an end section taken through a traveling bridge filtration unit in accordance with this invention.

With reference now to FIG. 1, a traveling bridge backwash system 10 is shown to include a tank 12 of concrete (or steel) construction consisting of a bottom wall or floor 14, a pair of side walls 16, 18, and a pair of end walls (not shown). A traveling bridge 20 (illustrated in simplified form parts removed for the sake of ease of understanding), is mounted atop the device for movement along the tank via wheels W, in a direction parallel to the side walls 16, 18 and in the longitudinal direction of the tank. The manner in which the bridge 20 is mounted and its associated drive are conventional in the art and form no part of this invention.

The tank 12 also includes an interior partition 22, in proximity to the side wall 16 and extending parallel thereto, along the length of the tank between the end walls. This partition 22 serves to divide the tank into a relatively large filter basin 26 and a relatively smaller filtrate channel 24.

The filter basin 26 is provided with a bed 28 of filter media which may comprise one or more layers of granular material (a coarse layer is shown at 28a), conventionally used in gravity type filtration systems. In this exemplary embodiment, the filter basin is configured as a single filter cell (also see FIG. 2), without the conventional vertically oriented dividers which are otherwise used to divide the filter basin into a plurality of individual cells. In another exemplary embodiment, the filter basin may be divided into a plurality of cells by means of vertically oriented cell dividers or partitions extending parallel to the end walls, between the side wall 18 and the partition 22. Two such dividers are shown in phantom at 29 in FIG. 4, defining a cell 31 therebetween. This is a conventional arrangement as shown in the '405 patent.

Suspended from the bridge 20 by supports 30, 32 is a backwash hood 34 which also extends transversely of the tank, substantially between the partition 22 and side wall 18 and in close proximity to the bed 28. The hood encloses a backwash header 36 (FIG. 3) which is connected to an inlet 38 of a backwash waste water pump 40 mounted externally of the hood 34. A discharge conduit 42 runs to a backwash trough (not shown) which may be fixed to the side wall 18 and which runs the length of the tank. In this way, the discharge outlet of the conduit can travel freely within the trough as the bridge 20 travels the length of the tank 12. It will be appreciated that the pump 40 may also be mounted on the bridge 20. It will also be appreciated that the hood 34, which is described in greater detail below, may be mounted for vertical movement (by any suitable means) relative to the bridge 20, toward and away from the bed 28. Alternatively, the hood may be located at a fixed distance, i.e., within a few inches or less, from the filter media bed surface.

Figure 4:
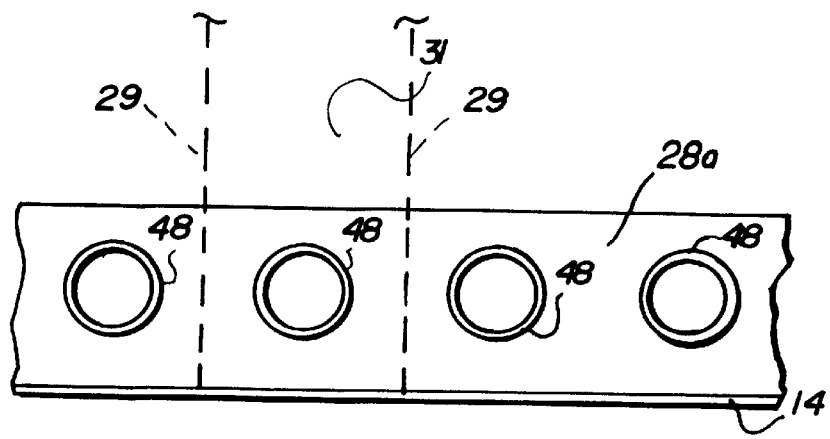
FIG. 4 is a partial side view illustrating the laterally arranged underdrain headers included in FIG. 1, with optional cell dividers shown in phantom.

Within the filter media bed 28, and in proximity to the bottom wall or floor 14, there are arranged a plurality of tubular underdrain headers 48 which, as best seen in FIGS. 1 and 4 extend in laterally spaced relationship at a substantially uniform height within the filter bed media. Each header is provided with slots or apertures 44 about the circumference thereof which allow filtrate to enter (or backwash water to exit) the header. Each header 48 is supported at opposite ends by the side wall 18 and partition 22 by suitable means. Thus, it will be appreciated that the headers 48 extend transversely of the filter basin length, and parallel to the hood 34. In a celled filter basin, each cell has its own header.

The end of each header 48 closest the side wall 18 is closed at 46, while the opposite end opens through the partition 22 at a round port 50. The ports 50 of the partition 22 are designed to be engaged by a backwash sealing shoe 52 which, in turn, connects to a main backwash pump 54. The entire backwash shoe assembly including the shoe 52 and pump 54 is secured to the bridge 20 by a pivot mount 56 for movement about a pivot pin 58. Thus, the assembly is mounted for axial movement with the bridge 20 along the length of the tank 12 adjacent the partition 22, as well as for pivotal movement relative to the bridge, in order to allow selective engagement of the shoe 52 with one or more of the ports 50.

Figure 2:
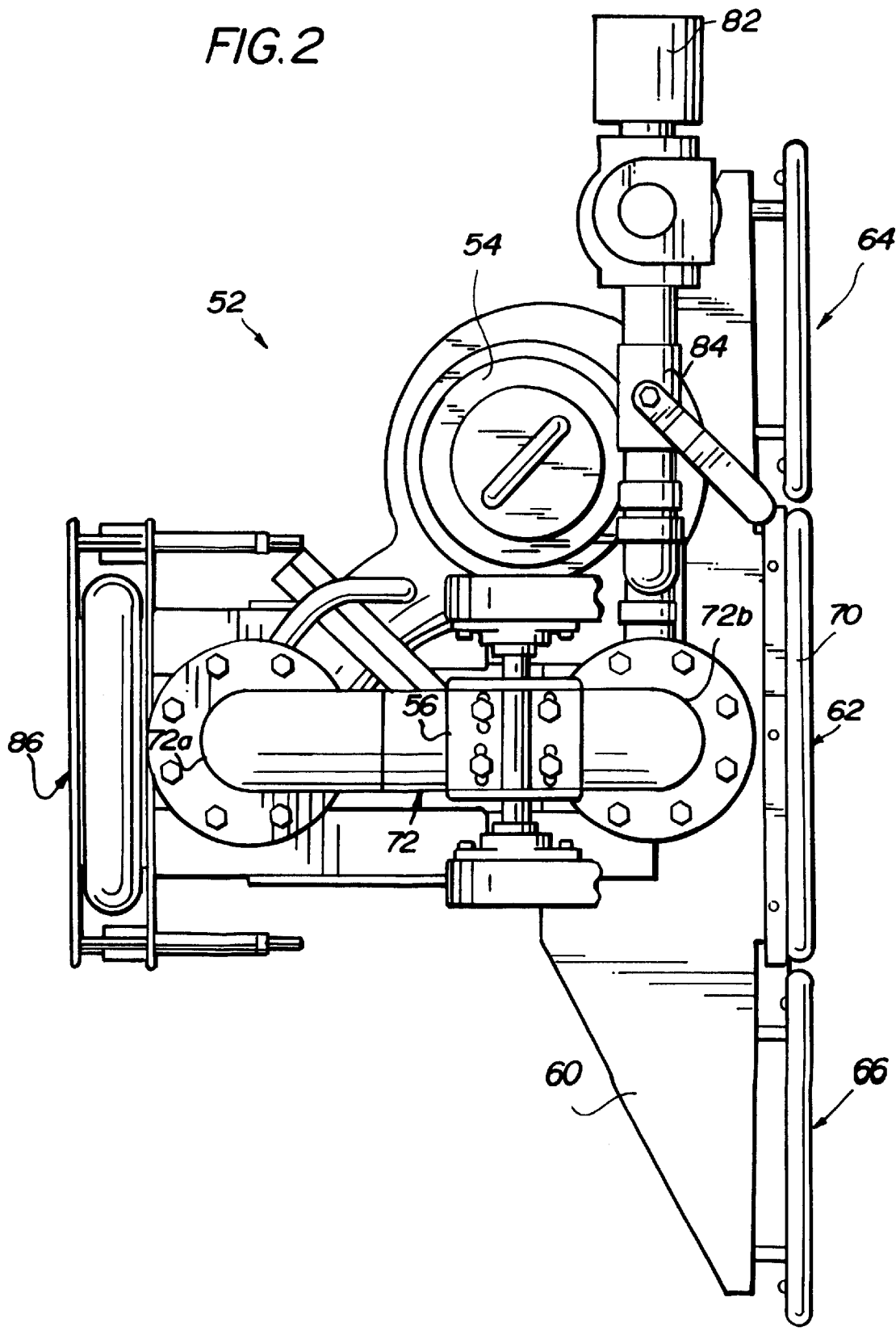
FIG. 2 is a plan view of the backwash sealing shoe assembly included in FIG. 1.
Figure 2A:
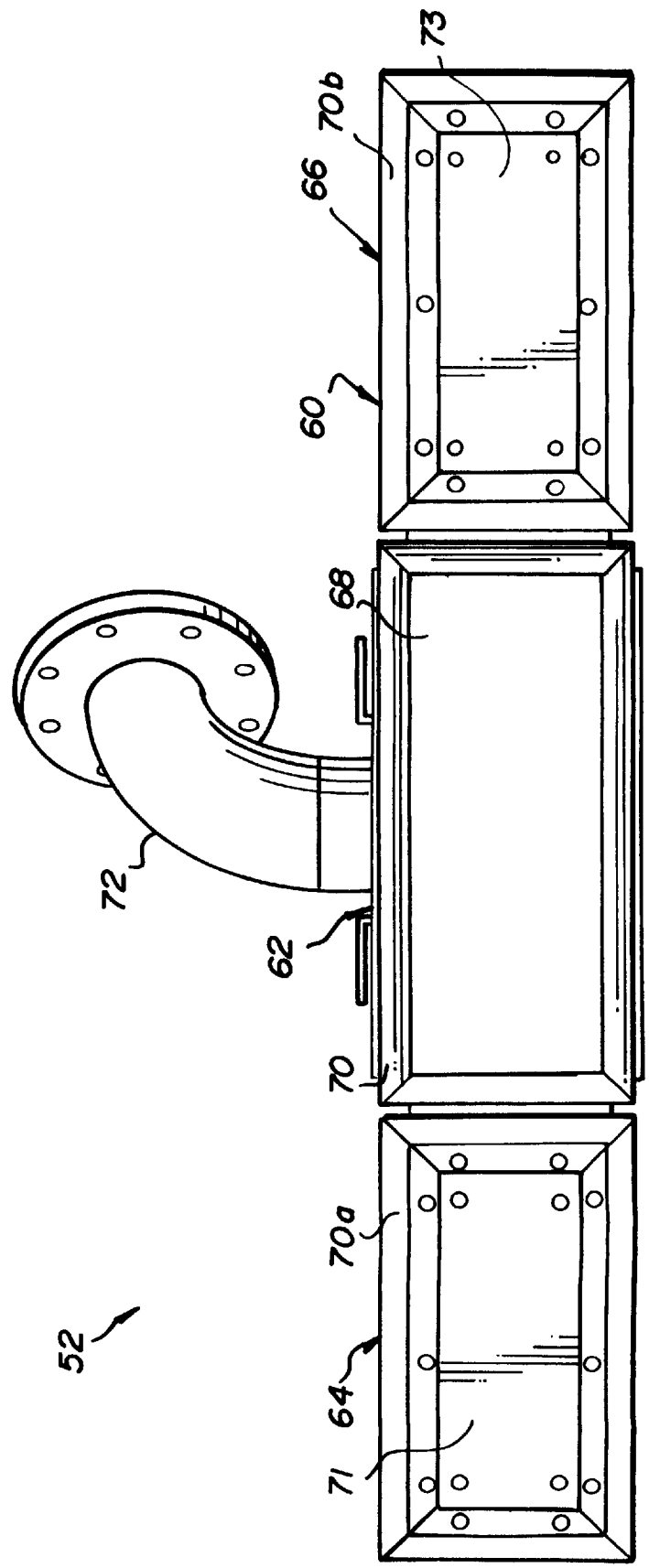
FIG. 2A is a side elevation of the sealing shoe shown in FIG. 2.

With reference now to FIGS. 2 and 2A, the backwash sealing shoe assembly in accordance with this invention will be described in detail. For a celless filter basin, a sealing shoe 52 is provided which includes a sealing body 60 which is divided into three sections: a center hydraulic section 62 and a pair of identical blank, blocking sections 64 and 66, one on either side of the center hydraulic section. The latter includes a rectangular opening 68 surrounded by a similarly shaped seal 70 which sealingly engages the partition 22 in an area which surrounds one or more of the ports 50. The opening in the sealing shoe connects to a multi-segment conduit 72 which is connected to the outlet of the backwash pump 54. It will be appreciated that the specific construction of the conduit 72 will be modified or adapted as required to attach to a specific backwash pump configuration. The blocking sections sealingly engage the partition 22 on either side of the one or more ports 50 sealed by the center section 68. Each blocking sections has its own seal 70a, 70b, surrounding a blocking plate, 71, 73, respectively, and are adapted to seal one or more adjacent ports so that no backwash liquid flowing into the bed from the center section can escape back into the filtrate channel via adjacent ports. Again, reference is made to, commonly owned U.S. Pat. No. 5,792,359 for a more detailed description of the sealing shoe assembly.

For a celled filter basin, the shoe need not have the blocking sections 64, 66 since the cell partitions prevent escape of backwash liquid through adjacent headers.

In accordance with the present invention, the conduit 72 has a substantially inverted U-shape, one leg 72a extending upwardly from the pump 54 to a short horizontal transition portion, and a second leg 72b extending downwardly to the shoe 52. A reduced diameter nozzle 74 is interposed in the conduit within the leg portion 72b, i.e., upstream of the ports 50 but downstream of backwash pump 54. Adjacent the nozzle 74, there is an air inlet opening 76 extending horizontally out of the conduit 72. An air supply conduit 78 connected at the opening 76 then extends upwardly to a location where the air supply line is open to atmosphere. Downstream of the air supply port or opening 76, there is a further reduced diameter insert 80 extending downwardly toward the sealing shoe assembly 52. With this arrangement, it will be appreciated that as the backwash liquid flows through the nozzle 74, expanding into pipe 80, air will be aspirated into the conduit 72 at the nozzle 74 via conduit 78, the mixture flowing through the insert 80, lower portion of conduit 72 and into the filter bed 28 via one or more ports 50 and associated lateral headers 48.

With reference now also to FIG. 2, an airflow meter 82 and an air supply control valve 84 are utilized to precisely control the amount of air aspirated into the backwash liquid.

A bellows actuator 86 is located laterally away from the pump 54 and may be of the type described in commonly owned copending applications Ser. No. 08/179,693 or Ser. No. 08/395,082. It should be noted, however, that the actuating mechanism by which the sealing shoe 52 is moved into and out of engagement with the tank partition wall 22 forms no part of this invention per se.

It should be pointed out here in the context of a celless filter basin, that while the lateral headers 48 and associated ports 50 are round, the center hydraulic section opening 68 as well as the blocking section plates 71, 73 are rectangular in shape. As a result, the size of the opening 68 and the plates 71, 73 can be modified as necessary to surround one or more of the ports 50. In other words, the hydraulic center section, and specifically, the opening 68, may be sized so that the backwash water from the filtrate channel may be supplied to one or more laterals 48 simultaneously. Similarly, the size of the plates 71, 73 may be modified to cover one or more adjacent laterals 48 on either side of the one or more laterals undergoing backwash.

Figure 3:
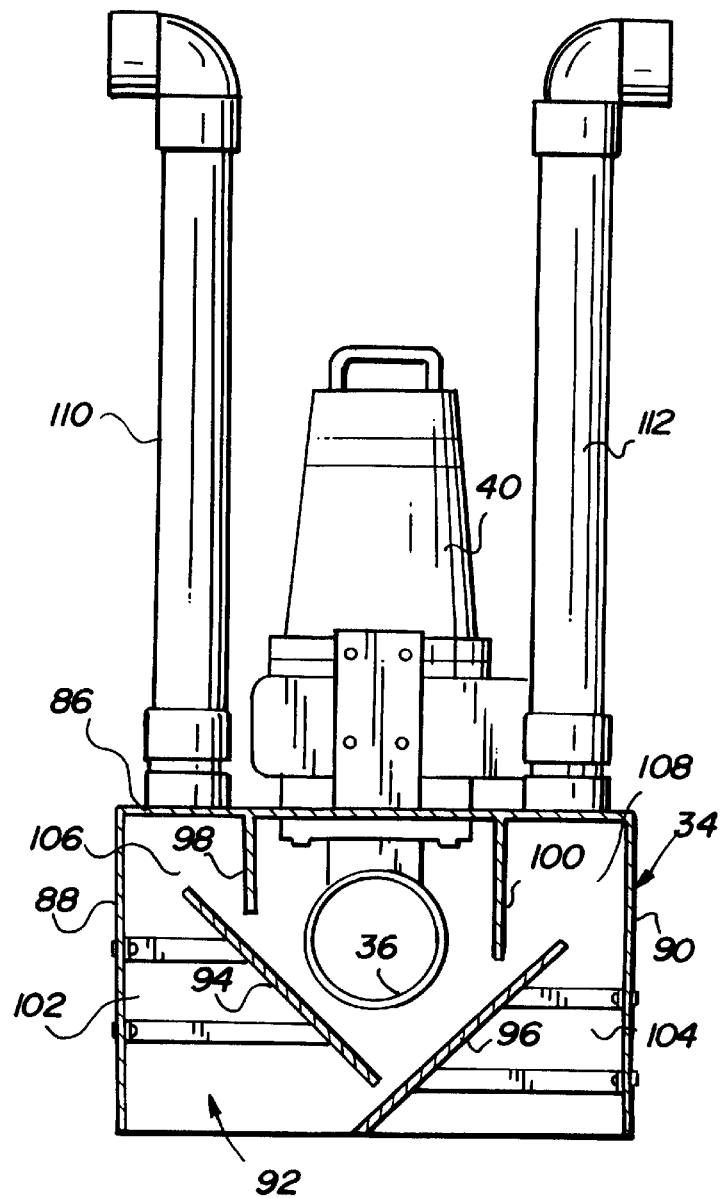
FIG. 3 is a side view, partially in section, of the backwash hood assembly included in FIG. 1.

With specific reference now to FIG. 3, the backwash hood 34 essentially comprises an inverted channel open at its lower end. More specifically, the hood includes a top wall 86 and a pair of depending side walls 88, 90, forming an open lower end 92. Enclosed within the backwash hood, as already mentioned above, is the laterally extending manifold 36, provided with a plurality of apertures along its length. This manifold is utilized to remove backwash waste water from the filter basin 26, with the aid of the backwash waste water pump 40 mounted on the hood assembly (or on the bridge per se).

The hood assembly also incorporates a pair of air/media diversion baffles 94, 96 extending along the length of the hood and arranged in an angular manner relative to the side walls 88 and 90 of the hood and substantially perpendicular relative to each other. Baffle 96 is spaced from, and overlaps, the baffle 94 at lower ends thereof. In addition, the underside of the hood is provided with a pair of air exclusion baffles 98, 100 extending vertically downwardly from the top wall 86 of the hood, on either side of the manifold 36. Baffles 98, 100 are parallel to each other, and are spaced from corresponding air/media baffles 94, 96, respectively, by substantially similar gaps. Because of the offset arrangement of baffles 94, 96, the air exclusion baffles have different lengths as best seen in FIG. 3. The baffles 94, 96, 98 and 100 form an open cage about the manifold 36, while providing agitation and washing zones 102, 104 below the air/media diversion baffles 94, 96, as well as a pair of air collection vent zones 106, 108 above the air/media diversion baffles 94, 96 and adjacent the air exclusion baffles 98 and 100. From these air collection vent zones, a pair of air vent pipes 110 and 112 extend upwardly out of the hood assembly.

With the above described arrangement, and again in the context of a celless filter basin, it may be seen that the mixture of air and backwash water will flow through one or more ports 50 into one or more lateral headers 48 undergoing backwash. At the same time, the blocking sections 64, 66 of the sealing shoe 52 will prevent any migration of backwash water from the area being backwashed and out into the filtrate channel 24 through the headers 48 and respective ports 50 on either side of the area being backwashed, i.e., on either side of the one or more ports 50 surrounded by center section 62 of the shoe 52. This makes the path of least resistance of hydraulic flow upwardly through the filter bed 28 and into the backwash hood 34 in such a manner that the fluidization and media cleansing of the filtration bed area being backwashed is achieved effectively and efficiently. Moreover, by aspirating controlled amounts of air into the backwash water via the aspirating nozzle 74, there is no need for a separate air compressor or blower, and pipes or conduits normally associated therewith, resulting in significant cost savings. The air aspirated into the backwash process can be vented to atmosphere by pipes 110, 112. At the same time, by separating the aspiration air, the backwash waste water and debris removed from the bed are free to exit the hood assembly via manifold 36, with the assistance of the backwash waste water pump 40. The waste water and debris then flows through the discharge conduit 42 to the waste water trough (not shown).

For celled filter basins, the backwash operation is similar, except that as already noted, the cell partitions prevent backwash liquid from escaping via adjacent headers, so that blocking sections 64, 66 can be eliminated.

It should also be understood that while the invention has been described in connection with a traveling bridge type filter, it has equal applicability to any filter that employs a combined air and water stream for backwashing, including but not necessarily limited to gravity and pressure filters, upflow and downflow filters, activated carbon columns and filters, and biological filters such as denitrifacation and ion exchange filters.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of backwashing a filter comprising:
   a) supplying a backwash liquid toward one end of a filter bed by means of a backwash pump and a supply conduit;
   b) providing a nozzle venturi in said supply conduit and aspirating air into the backwash liquid in said supply conduit, upstream of the bed;
   c) introducing a mixture of air and backwash liquid into the filter bed at said one end thereof; and
   d) expelling backwash liquid and air from an opposite end of the filter bed by locating a hood over an area of the filter bed being backwashed, and drawing backwash liquid, air and debris into said hood from said filter bed.

2. The method of claim 1 including monitoring and controlling the amount of air aspirated into the backwash liquid.

3. The method of claim 1 wherein said venturi nozzle is located in said supply conduit, adjacent an air inlet opening, downstream of said backwash pump.

4. The method of claim 1 and further comprising separating the air from the debris and from the backwash liquid in said hood.

5. The method of claim 4 wherein the air that is separated from the backwash liquid is vented to atmosphere.

6. The method of claim 1 wherein said filter bed is located in a filter basin and wherein said hood is suspended from a bridge located above said basin and adapted to travel along said basin.

7. The method of claim 6 wherein said filter bed comprises a single cell, and wherein a plurality of underdrain headers extend through the filter bed, each header having a respective port in a partition wall separating said filter basin from a filtrate channel, and further wherein steps a), b) and c) are carried out sequentially via one or more of said ports.

8. The method of claim 7 wherein step a) is carried out by pumping clean filtrate back into said bed.

9. The method of claim 6 wherein said filter bed comprises a plurality of cells, each cell having an underdrain header connected to a respective port in a partition wall separating said filter basin from a filtrate channel, and wherein steps a), b) and c) are carried out sequentially via one or more of said ports.

10. A filter system comprising a filter basin having a bed of filter media material therein; a filtrate channel proximate said basin; at least one tubular underdrain header in said bed and in fluid communication with said filtrate channel; a backwash pump having a backwash water supply conduit selectively engageable with said at least one underdrain header for supplying backwash liquid to said bed; a bridge movable along an upper end of said filter basin, said bridge carrying a backwash hood for movement along an upper surface of said bed; said hood having a backwash manifold therein in fluid communication with a second pump arranged to draw backwash waste water and debris out of said hood; and wherein said backwash water supply conduit includes means for aspirating air into said conduit at a location between said backwash pump and said bed.

11. The filter system of claim 10 and wherein said hood has a plurality of baffles for separating backwash air from backwash water and filter bed debris.

12. The filter system of claim 11 wherein said plurality of baffles includes a pair of air/water separation baffles defining a pair of agitation and washing zones, and a pair of air exclusion baffles defining a pair of air collection zones.

13. The filter system of claim 12 and including an air vent pipe extending upwardly from respective air collection zones.

14. The filter system of claim 10 wherein said backwash water supply conduit is connected to a sealing shoe assembly selectively engageable with one or more ports in a wall separating said filter basin from said filtrate channel, said one or more ports connected to respective underdrain headers.

15. The filter system of claim 14 wherein a plurality of said underdrain headers extend across said basin, in a lower portion of said bed, and wherein said sealing shoe assembly is selectively engageable with each of said headers.

16. The system of claim 10 wherein said bed filter media extends across said filter basin without division into plural cells.

17. A traveling bridge filtration apparatus including a tank having a pair of side walls, a pair of end walls and a floor defining a filter basin including a downflow filtration bed; a bridge adapted to travel across the top of the tank, said bridge supporting a backwash pump, a backwash hood and enclosed waste water removal manifold; a partition wall between said side walls forming a filtrate channel adjacent the filter basin for receiving filtered effluent from the tank and for supplying backwash liquid to said filtration bed via said backwash pump; an underdrain comprising a plurality of tubular headers extending in horizontally spaced relationship through said bed and in communication with said filtrate channel, each header being provided with a plurality of apertures along its length; and wherein said backwash pump is selectively engageable with each of said plurality of headers by means of a backwash supply conduit connected to a sealing shoe constructed to provide access to at least one of said headers, and further wherein said supply conduit incorporates a nozzle and an air supply port for aspirating air into the backwash liquid downstream of the backwash pump and upstream of said filtration bed.

18. The apparatus of claim 17 wherein said sealing shoe comprises a hydraulic section including an opening surrounded by a seal and adapted to sealingly engage said partition wall in surrounding relationship to at least one of said ports; and at least one blocking section adjacent said hydraulic section on one side thereof and including a plate surrounded by a seal and adapted to sealingly engage said wall partition in surrounding relationship to at least one adjacent port to thereby block flow from said tank through said at least one adjacent port during a backwash operation.

19. The apparatus of claim 18 and including a second blocking section adjacent said hydraulic section on an opposite side thereof.

20. The apparatus of claim 17 wherein said filtration bed comprises a single, non-partitioned bed.

21. The apparatus of claim 17 wherein said filtration bed is divided into a plurality of individual cells, each having one of said tubular headers therein.

* * * * *